United States Patent
Lee et al.

(10) Patent No.: US 6,829,860 B1
(45) Date of Patent: Dec. 14, 2004

(54) PELLETIZED STRAW MULCH AND METHOD OF USE THEREOF FOR SOIL STABILIZATION AND GRASS AND WILDFLOWER SEED ENHANCEMENT

(75) Inventors: Edward Lee, Manteno, IL (US); Terry Peters, Tekoa, WA (US)

(73) Assignees: Summit Seed, Inc., Manteno, IL (US); Seeds, Inc., Tekoa, WA (US)

( * ) Notice: Subject to any disclaimer, the term of this patent is extended or adjusted under 35 U.S.C. 154(b) by 0 days.

(21) Appl. No.: 09/507,983

(22) Filed: Feb. 22, 2000

(51) Int. Cl.⁷ .................................................. A01G 7/00
(52) U.S. Cl. ............................................................. 47/9
(58) Field of Search ........................ 47/9, 57.6, 1.01 R

(56) References Cited

U.S. PATENT DOCUMENTS

| | | |
|---|---|---|
| 2,163,860 A | 6/1939 | White |
| 3,946,660 A | 3/1976 | Kuhtreiber |
| 4,058,124 A | 11/1977 | Yen et al. |
| 4,123,489 A | 10/1978 | Kelley |
| 4,308,033 A | 12/1981 | Gunnerman |
| 4,369,597 A | 1/1983 | Leep et al. |
| 4,716,679 A | 1/1988 | Heard |
| 4,776,131 A | 10/1988 | Haeffner et al. |
| 4,813,996 A | 3/1989 | Gardner et al. |
| 5,389,116 A * | 2/1995 | Byrd .............................. 47/58 |
| 5,456,733 A | 10/1995 | Hamilton |
| 5,614,458 A | 3/1997 | Webb et al. |
| 5,709,479 A | 1/1998 | Bell |
| 5,741,832 A | 4/1998 | Spittle |
| 5,746,546 A * | 5/1998 | Hubbs et al. ............... 405/263 |
| D396,002 S | 7/1998 | Bell |
| 5,779,782 A | 7/1998 | Spittle |
| 5,879,695 A * | 3/1999 | Bastiaansen et al. ........ 424/405 |
| 5,916,027 A | 6/1999 | Spittle |
| 5,942,029 A | 8/1999 | Spittle |
| 6,076,299 A * | 6/2000 | Spittle et al. .................... 47/9 |
| 6,158,167 A * | 12/2000 | Spittle .............................. 47/9 |

* cited by examiner

*Primary Examiner*—Son T Nguyen
(74) *Attorney, Agent, or Firm*—James Creighton Wray; Meera P. Narasimhan

(57) ABSTRACT

The present invention is for a mulch device for soil stabilization and grass and wildflower seed enhancement comprising pelletized straw mulch having high bulk density, straw fibers, and fertilizing qualities. The pelletized straw mulch is spread onto a surface to reduce soil erosion, to promote seed establishment, to promote water infiltration and retention, to promote soil stabilization and to enhance soil fertilization. Also disclosed is a novel method of using straw for soil stabilization and grass and wildflower seed enhancement.

49 Claims, No Drawings

PELLETIZED STRAW MULCH AND METHOD OF USE THEREOF FOR SOIL STABILIZATION AND GRASS AND WILDFLOWER SEED ENHANCEMENT

FIELD OF THE INVENTION

The present invention relates to mulch products for soil stabilization and fertilization. In particular, the instant invention is for a novel pelletized straw mulch that may be used for soil stabilization and fertilization. Furthermore, the pelletized straw mulch of this invention may be used for grass and wildflower seed enhancement.

BACKGROUND OF THE INVENTION

Mulch products have traditionally been in the form of straw, wheat or similar products. These products are typically applied by a mulch-blowing machine or spread by hand onto the desired area to improve existing plant growth. These products are also provided with fertilizer to assist in the germination of seedlings.

When straw mulches are used, certain problems arise. Due to the relatively low bulk density of natural straw, it is difficult to spread straw mulches in a cost-effective manner. The most efficient way to spread straw mulch on large surfaces is by using expensive and dangerous mulch-blowing machines. Once the straw mulches are in place, they are easily blown away by winds because of their low bulk density. To alleviate this problem, different devices and methods are utilized to "lock down" the mulch, costing more money for the user. Another problem is storing straw mulches, because the relatively large size of straw bales means that they require large storage areas, which, again, costs money. Another problem encountered when using straw mulch is that weed seeds, cereal seeds and other undesirable seeds are often embedded in the straw, meaning that the straw mulch will transfer those undesirable seeds onto the ground they cover. A resulting problem, again, is that time, money and energy must be spent to rid the area covered by the straw mulch of weeds and other products resulting from the undesirable seeds. These and other disadvantages of using straw mulch have been cited in the art. For instance, U.S. Pat. No. 5,465,733 asserts that straw mulches often contaminate a seedbed with weed seeds. The same patent also states that straw depletes the seedbed of nitrogen due to the high C:N ratio of straw.

These deficiencies have heretofore apparently made straw an unlikely candidate for pelletizing, which is a process that has gained favor among mulch users as an alternative to straw mulch. Advances in the mulch and fertilizer industry have resulted in pelletized forms of waste paper and other similar substances being used as mulches. Sample pelletized mulches are disclosed in U.S. Pat. Nos. 5,456,733; 5,916,027; 4,123,489; 4,369,597; 4,339,890; 4,813,996; and 5,614,458. Reference is also made to U.S. Pat. Nos. 4,123,489; 4,625,679; 4,813,996; and 5,195,465 for their disclosure of processes for hammermilling and pelletizing of paper particles. These processes are, thus, well known in the art. While these advances are significant, pelletized paper products still have numerous disadvantages. For one, paper-based mulches, even when pelletized, tend to bond into a paper mat, especially at higher application rates. This matting effect inhibits oxygen transfer and prevents sunlight from penetrating the mat into the ground, which further prevents seedling from emerging through the mat. Secondly, pelletized paper mulches still fail to deliver the optimal bulk density needed to prevent the mulch from being blown away by gusts of wind. Additionally, some pelletized paper mulches fail to swell and rupture optimally when absorbing water, which leads to poor soil coverage. The result is that pelletized paper mulches still have some of the same problems as straw mulch, such as difficulties in spreading and maintaining on the ground. As stated previously, this will result in higher costs for the user, in terms of labor, storage and replacement. Another problem with pelletized paper-based mulch, especially newsprint and magazines, is that the ink from those products are often toxic. To diminish or negate the toxicity, detoxification processes must be used on the paper products before hammermilling and pelletizing. This will add to the cost of pelletized paper mulches.

BRIEF SUMMARY OF THE INVENTION

As indicated in the art, conventional straw mulches do not have favorable mulching properties compared with pelletized paper mulches. Reference is made to U.S. Pat. No. 5,456,733. However, the present invention goes against conventional wisdom and takes advantage of the benefits of both straw mulches and pelletizing paper mulches, without their individual disadvantages stated above, to bring about a superior mulch. The present pelletized straw mulch has the favorable mulching properties of a higher bulk density than pelletized paper products, greater reduction of weed seeds embedded in the straw pellets, the natural fertilizing properties of straw, a greater volume of water absorption than pelletized paper products and straw, the advantageous effects of matting of the pelletized straw mulch matrix—as opposed to pelletized paper mulches—and ease in spreading onto a surface.

The novel pelletized straw mulch is made of natural straw fibers. Straw fibers were originally used as mulches because of their natural fertilizing properties that benefit the soil when they decay. The present invention has maintained this important advantage of straw fibers that paper pellets lack. Moreover, once the straw fibers are pelletized using methods known in the art, the pelletized straw mulch has a greater bulk density than any other mulch or pellet products in the art, including pelletized paper mulches. The result is that when the pelletized straw mulch is spread onto soil, it will stay on the soil better than existing mulches and pelletized paper mulches prior to absorption of water. Consequently, the novel pelletized straw mulch reduces soil erosion better than any other pelletized mulch.

The mulch matrix of the present invention increases moisture retention under the matrix and on the soil, which further increases water infiltration into the soil. An additional benefit of this superior mulch matrix is that it dramatically increases seed establishment success by holding the moisture under the matrix and by allowing for the exchange of oxygen between the matrix and the soil. Tackifiers may be used to chemically strengthen the bond of the pelletized straw mulch to maintain it on the soil, while organic fibers may be used to mechanically strengthen the bond of the pelletized straw mulch.

Conventional pelletized paper mats are typically over-applied resulting in a relatively thick mat. These conventional pelletized paper mats inhibit oxygen transfer therethrough, inhibit sunlight exposure through to the soil, block seedling germination, and fail to hold moisture adequately, which often results in quick evaporation or dissipation of water. Conversely, due to the instant pelletized straw mulch's high bulk density, it is not necessary to spread a large amount of the instant pelletized straw mulch onto the desired surface area. The mat formed by the instant pelletized straw mulch permits the exchange of oxygen freely therethrough, holds moisture better than pelletized paper mats, does not block seed germination and allows sunlight to shine therethrough.

The present invention has environmental benefits because the ban on the burning of straw, especially grass straw, has left a surplus of straw in the United States. This invention would put the straw surplus to beneficial usage and reduce the surplus. Its advantages over plain straw mulch would mean that less space is needed to store the pelletized straw mulch, as opposed to regular straw. The lack of toxic ink in straw means that no pollutants will seep into the soil upon which the novel pelletized straw mulch is spread, and no money will be needed to detoxify the pelletized paper mulch products presently in use. These and other benefits are known to one of ordinary skill in the art.

It is, therefore, an object of the present invention to teach a novel pelletized straw mulch for soil stabilization, increased water infiltration, and grass and wildflower seed enhancement.

It is also an object of the present invention to teach a novel method of making pelletized straw mulch.

Another object of the present invention is to teach a pelletized straw mulch that is easy to spread.

Another object of the present invention is to teach a pelletized straw mulch that has nutritional value that benefits the soil on which it is spread.

Another object of the present invention is to teach a pelletized straw mulch having a high bulk density that allows it to stabilize soil so as to not be easily blown away by gusts of wind prior to absorption of water.

Another object of the present invention is to teach a pelletized straw mulch that holds moisture and humidity and reduces evaporation.

Another object of the present invention is to teach a pelletized straw mulch that is free of weed seeds.

Another object of the present invention is to teach a pelletized straw that swells upon absorption of water and ruptures to produce mulch covering on the soil surface.

Another object of the present invention is to teach a pelletized straw mulch that moderates temperature fluctuations on the soil to prevent temperature-induced injury thereto.

Another object of the present invention is to teach a pelletized straw mulch that has additives injected therein having beneficial effects on the soil.

Another object of the present invention is to teach a pelletized straw mulch that has tackifiers injected therein to chemically bind the mulch in place to form a mulch matrix.

Another object of the present invention is to teach a pelletized straw mulch that is more economical to make and use.

Another object of the present invention is to teach a pelletized straw mulch that is environmentally friendly in allowing surplus straw to be put to beneficial usage.

Another object of the present invention is to teach a pelletized straw mulch that is easy and inexpensive to store.

Other objects, features and advantages of the present invention will become readily apparent from the following detailed description and accompanying drawings.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention. Those skilled in the art will appreciate that the conception, upon which this disclosure is based, may readily be utilized as a basis for the designing of other devices for carrying out the several purposes of the present invention. It is important, therefore, that the invention be regarded as including such equivalent constructions insofar as they do not depart from the spirit and scope of the present disclosure.

DETAILED DESCRIPTION OF THE INVENTION

The present invention is directed to a pelletized straw mulch product for soil stabilization, increased water infiltration and grass and wildflower seed enhancement having the benefits of straw mulch, but none of its deficiencies or the disadvantages of pelletized paper mulches. As the name suggests, pelletized straw mulch is made from conventional straw fibers. Due to the large variety of sources of straw that exist, the following table (Table 1) is a representative list of sources from which straw may be obtained and the corresponding sample types.

TABLE 1

| Straw Source | Sample Types |
| --- | --- |
| Cereal Grain Straw | Wheat, barley, rice, oats and flex. (Rice and flex must be removed from the field each year.) |
| Turfgrass Seed Straw | Kentucky Bluegrass, Ryegrass, Tall Fescue, Bentgrass, Fine Fescues, Bermuda and Rough Bluegrass. |
| Forages Straw | Orchard grass, Brome grass, Red Top and Timothy. |
| Reclaimation Straw | Crested wheatgrass, Little Bluestem and Big Bluestem. |

One of skill in the art will know that other sources of straw are equally viable for making the pelletized straw mulch disclosed herein. The straw is typically obtained as a by-product of seed production, whereby the viable seeds have been removed. The straw is selected to be as free of weed seeds as possible. As stated previously, the potential for embedded weed seeds is one reason that straw has not been favored as a mulching product, despite its natural fertilizing qualities.

One embodiment of the present invention comprises a method of using the above-described types of straw for soil stabilization and grass and wildflower seed enhancement. The straw is first hammermilled to rupture the straw fibers and to decrease the size of the straw. Reference is made to U.S. Pat. Nos. 4,123,489; 4,625,679; 4,813,996; and 5,195,645 for a detailed disclosure of the hammermilling process. A hammermill screen is used to cut the straw to decrease its size. It is preferred that the length of the hammermilled straw by between about 3/16 inch to 3/4 inch. The ruptured straw fibers are more water absorbent than unruptured straw fibers. Additionally, the rupturing accomplishes another goal of reducing weeds seeds in the straw fibers. This hammermilling step is very delicate because over-hammermilling will result in the formation of flour, which is advantageous for the feed industry, but not for the mulching industry. In fact, flour has little to no mulching properties, so the hammermilling step must be performed with care.

The second step is to pelletize the straw after the hammermilling step. The pelletizing step makes the straw fibers into a high bulk density pelletized straw mulch. It is preferred that the straw fibers be pelletized to a bulk density of about 42 to 44 pounds per bushel. This step further eliminates any weed seeds embedded in the straw fibers. It is also preferred that the straw fibers be pelletized to comprise the dimensions of about 3/16 inch to 1/2 inch in diameter and about 3/16 inch to 3/4 inch in length. While the dimensions and the density of the pelletized straw mulch are specified above, the shape of the instant pelletized straw mulch need not be as exacting. In fact, the pelletized straw mulch may comprise a flat or round shape, among others, depending on the user's preference. Reference is again made to U.S. Pat. Nos. 4,123,489; 4,625,679; 4,813,996; and 5,195,645 for a detailed disclosure of the pelletizing process.

One advantage found in pelletizing straw is that it is easier to pelletize than newspaper print. This is because a natural glue in straw, called lignin, binds the straw fibers together once the temperature during the pelletizing process reaches 110° Fahrenheit. This favorable property in straw has yet to be taken advantage of in existing mulch products—even pelletized mulch products.

It is typical for the straw mulch to comprise about 12% to 26% moisture after undergoing both the hammermilling and pelletizing processes. Thus, the third step is to dry the pellets to comprise less than 10% moisture. In this way, molding of the straw mulch will be prevented. This drying step is accomplished using any of the methods known in the art.

Once the pelletized straw has dried, it may be stored for sale or later use. When one is ready to use the pelletized straw mulch of the instant invention, any conventional method of spreading the novel pelletized straw mulch known to one of skill in the art is acceptable, such as by machine or by hand. Typically, the pelletized straw mulch is either spread onto soil already covered with seeds or spread in conjunction with seeds onto bare soil to facilitate the seed germination and establishment process. Mulch may also applied onto soil having plants already growing thereon for additional fertilizing benefits. This spreading step will be greatly facilitated by the aforementioned favorable properties of the pelletized straw mulch. For instance, due to its high bulk density, the pelletized straw mulch will not need special equipment to spread it over a longer distance around the spreader or spreading machine. For the same reason, the present pelletized straw mulch will not need to be applied in a high volume, because less of it will work even more effectively than heavy applications of other existing mulches. This will save the user considerable time and money, and will make application of the present pelletized straw mulch much more convenient.

After the novel pelletized straw mulch is spread onto the desired surface, any watering of the surface will activate the mulch to allow it to reduce soil erosion, to promote seed establishment, to promote water infiltration and retention, to promote soil stabilization, and to enhance soil fertilization. Upon contacting water or any other type of moisture or fluid, the pelletized straw mulch absorbs the moisture and swells to increase coverage of the surface. Another advantage of the instant invention is that the pelletized straw will absorb four times its weight in moisture. The pelletized straw mulch will eventually absorb so much moisture that it will rupture, whereupon it will form a mulch matrix. This mulch matrix may appear to be similar to existing pelletized paper mulch matrices, but it has a distinctly improved performance as a mulch matrix. In contrast to pelletized paper mulch matrices, the present pelletized straw mulch matrix does not have a disadvantageous matting effect, which hampers the breatheability of the matrix. Rather, the instant mulch matrix allows free exchange of oxygen and carbon dioxide therethrough. The present mulch matrix also allows seedlings to germinate therethrough, in contrast with pelletized paper mulches presently in use. Additionally, even if a "mat" forms from over-application of the pelletized straw mulch, this mat is shown to have properties favoring more seed germination by increasing water infiltration and retention on the soil surface.

There is often a need in the mulching industry to impregnate the mulch with various substances to add different qualities to the mulch. With this in mind, another embodiment of the present invention comprises firstly impregnating tackifiers into the straw fibers before the pelletizing step. Tackifiers are known in the industry to chemically bind mulch onto the surface on which they are spread. Tackifiers also bond the mulch fibers to each other to help the fibers adhere thereto. In the instant case, the tackifiers would be activated after the pelletized straw mulch ruptures to form the mulch matrix. Methods of impregnating the tackifiers into the straw fibers are known in the art.

The preferred tackifiers used with the instant invention are synthetic tackifiers. The most preferred synthetic tackifiers are linear copolymers, especially anionic polyacrylamides (PAM), which "thicken" the water to hold it in place, instead of allowing it to dissipate or evaporate quickly. This has the dual effects of moisture retention and strengthening the bond of the pelletized straw mulch to the soil. Anionic PAMs are preferred over cationic and neutral PAMs, because the latter types—especially cationic PAMs—are harmful to the environment due to their higher acrylamide monomer (AMD) content. Specifically, PAMs are used to strengthen soil cohesion, thus reducing soil loss; to preserve surface roughness; to increase viscosity, thus reducing particle detachment and chemical and fertilizer runoff; to flocculate suspended solids, thus reducing sediment movement; and to preserve pore continuity, thus maintaining higher water infiltration into the soil. Any of the wide variety of PAMs used in the art are acceptable for use with the instant pelletized straw mulch invention.

Typically, PAM products vary in the following parameters: (1) negative charge density from about 2% to 50%; and (2) molecular weight from about 12 Milligrams/mole to 25 Milligrams/mole. The most common parameters for PAM products are: (1) a negative charge density of about 18%; and (2) a molecular weight from 12 Milligrams/mole to 15 Milligrams/mole. Favorable PAM parameters found in the application of the instant invention have been: (1) a 30% negative charge density; and (2) from 12 Milligrams/mole to 15 Milligrams/mole molecular weight. The most preferred parameters for optimal usage of the impregnated PAMs comprise: (1) 45%–50% negative charge density; and (2) 20 Milligrams/mole to 24 Milligrams/mole molecular weight. Commercial PAM may be obtained from American Cyanamid Company under the tradename SUPERFLOC 8363A and is manufactured by CYTEC Industries of Wayne, N.J.

In place of synthetic tackifiers, organic tackifiers may also be impregnated into the straw fibers before the pelletizing step. Organic tackifiers swell and become sticky in the presence of water to form a slurry. These natural tackifiers act as gelling, hardening and holding agents to retain moisture and to provide a stable microclimate for seed germination. The preferred organic tackifiers are vegetable-based adhesives, most preferably those derived from guar or psyllium. Commercial vegetable-based adhesives are available under the tradenames of Eco Tak-OP for guar-based adhesives and Eco-Tak-SAT for psyllium-based adhesives, both made by Eastern Products, Inc. The step of firstly impregnating organic tackifiers into the straw fibers is known in the art.

A further embodiment of the instant invention comprises a secondly impregnating step for impregnating additives into the straw fibers before the pelletizing step. This secondly impregnating step may be used to add numerous other qualities to the pelletized straw mulch product. Four additives that may be impregnated via this step are: organic fibers; Bentonite; fertilizers; and cross-linked polymers. In contrast with chemical tackifiers, organic fibers are used to mechanically bond the pelletized straw mulch onto the surface and to each other upon formation of the mulch matrix. Thus, chemical tackifiers and organic fibers may both be impregnated into straw fibers before the pelletizing step for an additive bonding effect. The most preferred organic fibers are cotton by-products, such as Mote cotton which is commercially available from South Plains Textiles, Inc. of Wilson, Tex.

Bentonite is an additive that is often impregnated into pelletized mulches to increase their durability. Likewise, this additive may be impregnated into the straw fibers of the present invention to add to the durability of the pelletized straw mulch. If the pelletized straw mulch is more durable, it will be easier to handle during storage and will not break apart before spreading. Another benefit of Bentonite is its ability to enhance the pelletized straw mulch's moisture absorbing properties. Bentonite is known to hold 15 to 20 times its weight in moisture. By impregnating the pelletized straw mulch with Bentonite, the novel device will be able to hold even more moisture and provide greater soil coverage when it ruptures after absorbing moisture.

The preferred embodiment of the present invention comprises approximately by weight: 90% straw; 5% Bentonite±0.5%; 5% Mote cotton±1.0%; and 0.0015% PAM±1.0%.

Fertilizers are another group of additives that may be impregnated into the straw fibers before the pelletizing step of the present invention. The fertilizers add to the natural fertilizing qualities of the straw itself. One of skill in the art will know that any of the conventional fertilizers may used in the this impregnating step.

While cross-linked polymers may be impregnated into the straw fibers of the instant invention, they operate in a wholly different fashion than the aforementioned linear polymers. Cross-linked polymers, also called super water-absorbent polymers, function as moisture- and nutrient-retention agents to maintain a steady level of moisture and nutrients in the soil on which it is applied. This moisture is held in the reservoir for later use by the plant or soil. Commercially available cross-linked polymers are sold under the trademarks Stockosorb and Soil Moist Polymer Products, among others. Soil Moist Polymer Products are manufactured by JRM Chemical, Inc. of Cleveland, Ohio, while Stockosorb is distributed in the Untied States by The Resource Management Group, Inc. of Dunwoody, Ga. Preferred cross-linked polymers are cross-linked polyacrylamides. Thus, the above additives may be used to increase the performance of the novel pelletized straw mulch.

A further embodiment of the present invention is pelletized straw mulch having the properties described above in relation to the method of using straw for soil stabilization and grass and wildflower seed enhancement.

The foregoing discussion is illustrative of the invention. However, since many embodiments of the invention can be made without departing from the spirit and scope of the invention, the invention resides wholly in the claims hereinafter appended.

Hence, while the invention has been described in connection with a preferred embodiment, it will be understood that it is not intended that the invention be limited to that embodiment. On the contrary, it is intended to cover all alternatives, modifications and equivalents as may be included within the spirit and scope of the invention as disclosed.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A mulch device for soil stabilization and grass and wildflower seed enhancement comprising pelletized straw mulch having a bulk density of about 42 to 44 pounds per bushel, straw fibers, and fertilizing qualities, whereby the pelletized straw mulch is spread onto a surface to reduce soil erosion, to promote seed establishment, to promote water infiltration and retention, to promote soil stabilization and to enhance soil fertilization.

2. The mulch device of claim 1 wherein the pelletized straw mulch comprises pelletized straw mulch having a flat shape.

3. The mulch device of claim 1 wherein the pelletized straw mulch comprises pelletized straw mulch having a round shape.

4. The mulch device of claim 1 wherein the pelletized straw mulch comprises pelletized straw mulch having the following dimensions:

(a) a diameter of about 3/16 inch to 1/2 inch; and
 (b) a length of about 3/16 inch to 3/4 inch.

5. The mulch device of claim 1 wherein the pelletized straw mulch comprises a pelletized straw mulch matrix that forms upon absorption of water.

6. The mulch device of claim 5 wherein the pelletized straw mulch matrix comprises a pelletized straw mat, whereby the pelletized straw mat promotes more seed germination by further increasing water infiltration and retention on the surface.

7. The mulch device of claim 1 further comprising tackifiers impregnated in the pelletized straw mulch, the tackifiers chemically bonding the pelletized straw mulch onto the surface.

8. The mulch device of claim 7 wherein the tackifiers comprise synthetic tackifiers.

9. The mulch device of claim 8 wherein the synthetic tackifiers comprise linear polymers.

10. The mulch device of claim 9 wherein the linear polymers comprise linear copolymers.

11. The mulch device of claim 10 wherein the linear copolymers comprise polyacrylamides.

12. The mulch device of claim 11 Wherein the polyacrylamides comprise polyacrylamides having:

(a) negative charge density from about 2% to 50%; and
(a) a molecular weight from about 12 Milligrams/mole to 25 Milligrams/mole.

13. The mulch device of claim 12 wherein the polyacrylamides comprise polyacrylamides having:
   (a) a negative charge density of about 18%; and
   (b) a molecular weight from about 12 Milligrams/mole to 15 Milligrams/mole.

14. The mulch device of claim 12 wherein the polyacrylamides comprise polyacrylamides having:
   (a) a negative charge density of about 30%; and
   (b) a molecular weight from about 12 Milligrams/mole to 15 Milligrams/mole.

15. The mulch device of claim 12 wherein the polyacrylamides comprise polyacrylamides having:
   (c) a negative charge density from about 45% to 50%; and
   (d) a molecular weight from about 20 Milligrams/mole to 24 Milligrams/mole.

16. The mulch device of claim 7 wherein the tackifiers comprise organic tackifiers.

17. The mulch device of claim 16 wherein the organic tackifiers comprise vegetable-based adhesives.

18. The mulch device of claim 17 wherein the vegetable-based adhesives comprise vegetable-based adhesives derived from guar.

19. The mulch device of claim 17 herein the vegetable-based adhesives comprise vegetable-based adhesives derived from psyllium.

20. The mulch device of claim 1 further comprising additives impregnated in the pelletized straw mulch.

21. The mulch device of claim 20 herein the additives comprise organic fibers, the organic fibers mechanically bonding the pelletized straw mulch onto the surface and to each other.

22. The mulch device of claim 21 wherein the organic fibers comprise cotton by-products.

23. The mulch device of claim 20 wherein the additives comprise synthetic fibers, the synthetic fibers mechanically bonding the pelletized straw mulch onto the surface and to each other.

24. The mulch device of claim 20 wherein the additives comprise Bentonite, the Bentonite increasing the durability of the pelletized straw mulch.

25. The mulch device of claim 20 wherein the additives comprise fertilizers, the fertilizers adding to the fertilizing qualities of the pelletized straw mulch.

26. The mulch device of claim 20 wherein the additives comprise cross-linked polymers, the cross-linked polymers further promoting water retention in the pelletized straw mulch.

27. A method of using straw for soil stabilization and grass and wildflower seed enhancement, the straw having straw fibers and fertilizing qualities, comprising the steps of:
   (a) hammermilling the straw, wherein the hammermilling step ruptures the straw fibers, decreases the size of the straw, reduces weed seeds and makes the straw water absorbent;
   (b) pelletizing the straw after the hammermilling step to make pelletized straw mulch having a bulk density of about 42 to 44 pounds per bushel, the pelletizing step further eliminating the weed seeds in the straw;
   (c) drying the pelletized straw mulch, wherein the drying step prevents mold formation in the pelletized straw mulch;
   (d) spreading the pelletized straw mulch onto a surface; and
   (e) watering the pelletized straw mulch, wherein the pelletized straw mulch absorbs the water, swells, and ruptures to form a mulch matrix,
   whereby the pelletized straw mulch may be used to reduce soil erosion, to promote seed establishment, to promote water infiltration and retention, to promote soil stabilization and to enhance soil fertilization.

28. The method of using straw of claim 27 wherein the hammermilling step comprises step of hammermilling the straw to a length of about 3/16 inch to 3/4 inch.

29. The method of using straw of claim 27 wherein the pelletizing step comprises the step of pelletizing the straw fibers to the following dimensions:
   (a) a diameter of about 3/16 inch to 1/2 inch; and
   (b) a length of about 3/16 inch to 3/4 inch.

30. The method of using straw of claim 27 wherein the drying step comprises the step of drying the pelletized straw mulch to comprise less than ten percent moisture by weight.

31. The method of using straw of claim 27 further comprising the step of firstly impregnating tackifiers into the straw fibers before the pelletizing step, whereby the tackifiers chemically bond the pelletized straw mulch onto the surface after forming the mulch matrix.

32. The method of using straw of claim 31 wherein the firstly impregnating step comprises the step of firstly impregnating synthetic tackifiers into the straw fibers before the pelletizing step.

33. The method of using straw of claim 32 wherein the firstly impregnating step comprises the step of firstly impregnating linear polymers into the straw fibers before the pelletizing step.

34. The method of using straw of claim 33 wherein the firstly impregnating step comprises the step of firstly impregnating linear copolymers into the straw fibers before the pelletizing step.

35. The method of using straw of claim 34 wherein the firstly impregnating step comprises the step of firstly impregnating polyacrylamides into the straw fibers before the pelletizing step.

36. The method of using straw of claim 35 wherein the firstly impregnating step comprises the step of firstly impregnating polyacrylamides into the straw fibers before the pelletizing step, the polyacrylamides having:
   (a) a negative charge density from about 2% to 50%; and
   (b) a molecular weight from about 12 Milligrams/mole to 25 Milligrams/mole.

37. The method of using straw of claim 36 wherein the firstly impregnating step comprises the step of firstly impregnating polyacrylamides into the straw fibers before the pelletizing step, the polyacrylamides having:
   (a) a negative charge density of about 18%; and
   (b) a molecular weight from about 12 Milligrams/mole to 15 Milligrams/mole.

38. The method of using straw of claim 36 wherein the firstly impregnating step comprises the step of firstly impregnating polyacrylamides into the straw fibers before the pelletizing step, the polyacrylamides having:
   (a) a negative charge density of about 30%; and
   (b) a molecular weight from about 12 Milligrams/mole to 15 Milligrams/mole.

39. The method of using straw of claim 36 wherein the firstly impregnating step comprises the step of firstly impregnating polyacrylamides into the straw fibers before the pelletizing step, the polyacrylamides having:
   (a) a negative charge density from about 45% to 50%; and (b) a molecular weight from about 20 Milligrams/mole to 24 Milligrams/mole.

40. The method of using straw of claim 31 herein the firstly impregnating step comprises the step of firstly impregnating organic tackifiers into the straw fibers before the pelletizing step.

41. The method of using straw of claim 40 wherein the firstly impregnating step comprises the step of firstly impregnating vegetable-based adhesives into the straw fibers before the pelletizing step.

42. The method of using straw of claim 41 herein the firstly impregnating vegetable-based adhesives step comprises the step of firstly impregnating vegetable-based adhesives derived from guar into the straw fibers before the pelletizing step.

43. The method of using straw of claim 41 wherein the firstly impregnating vegetable-based adhesives step comprises the step of firstly impregnating vegetable-based adhesives derived from psyllium into the straw fibers before the pelletizing step.

44. The method of using straw of claim 27 further comprising the step of secondly impregnating additives into the straw fibers before the pelletizing step.

45. The method of using straw of claim 44 wherein the secondly impregnating step comprises the step of secondly impregnating organic fibers into the straw fibers, whereby the organic fibers mechanically bond the pelletized straw mulch onto the surface after forming the mulch matrix.

46. The method of using straw of claim 45 wherein the secondly impregnating organic fibers step comprises the step of secondly impregnating cotton by-products into the straw fibers, whereby the cotton by-products mechanically bond the pelletized straw mulch onto the surface after forming the mulch matrix.

47. The method of using straw of claim 44 wherein the secondly impregnating step comprises the step of impregnating Bentonite into the straw fibers, the Bentonite increasing the durability of the pelletized straw mulch.

48. A The method of using straw of claim 44 wherein the secondly impregnating step comprises the step of secondly impregnating fertilizers into the straw fibers, the fertilizers adding to the fertilizing qualities of the pelletized straw mulch.

49. The method of using straw of claim 44 wherein the secondly impregnating step comprises the step of secondly impregnating cross-linked polymers into the straw fibers, the cross-linked polymers further promoting water retention in the pelletized straw mulch.

* * * * *